Inventor:
John Farmer
By Wilmer Mechlin
his Attorney

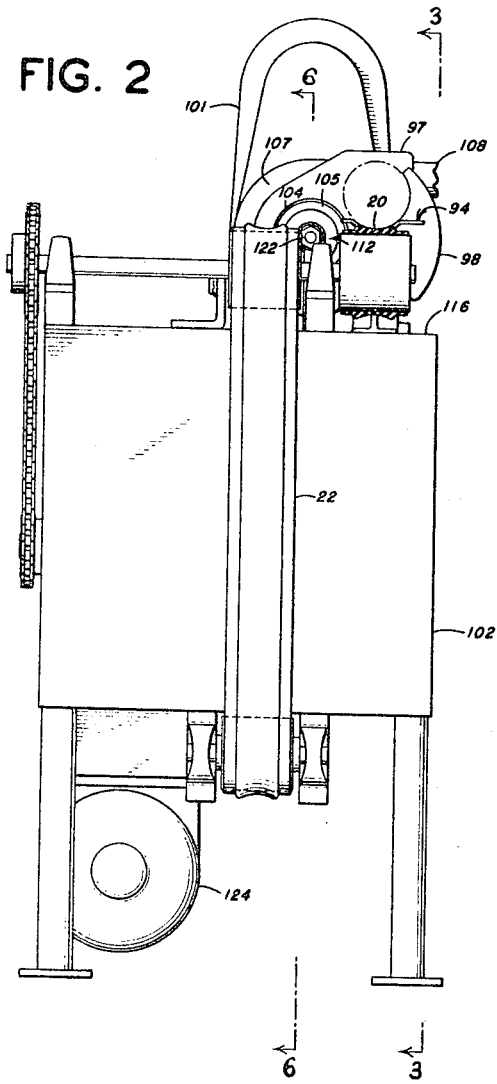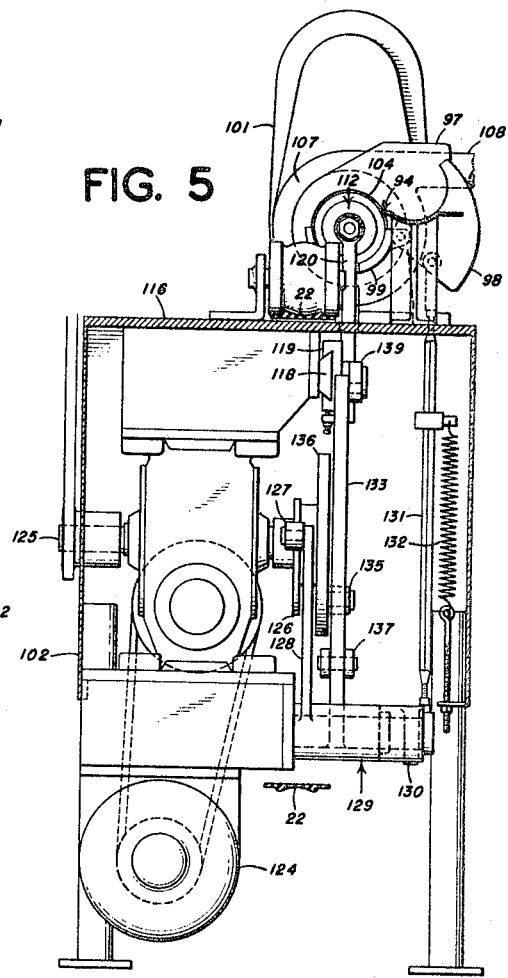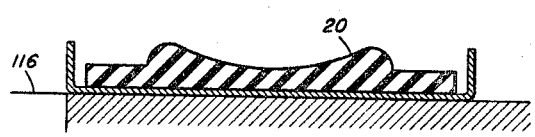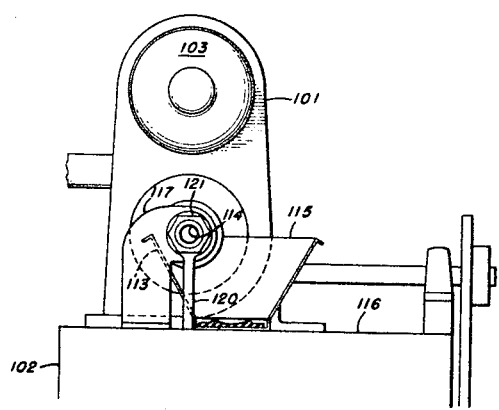

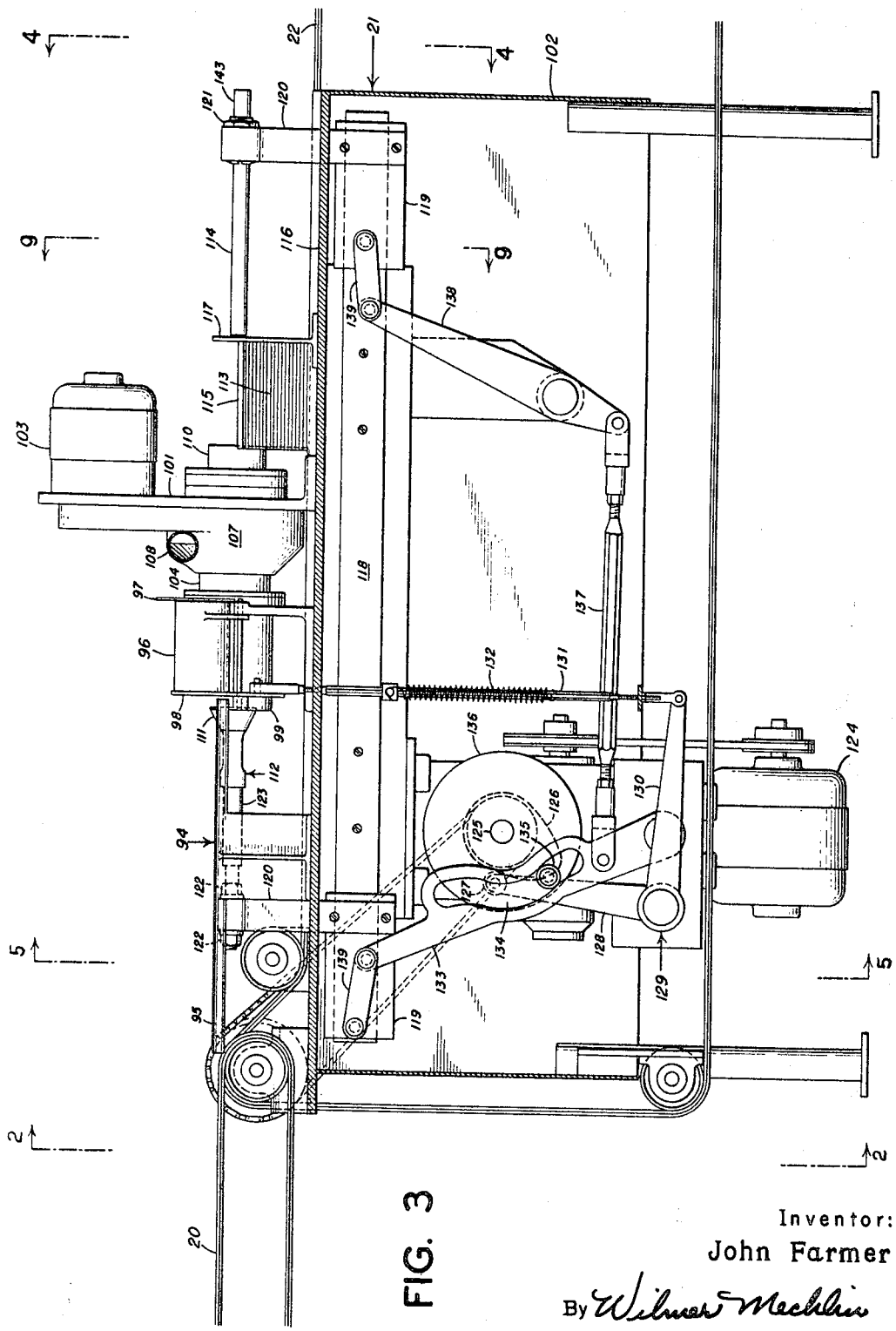

March 25, 1969          J. FARMER          3,434,516

MACHINE FOR CORING PINEAPPLE SLICES

Original Filed Sept. 29, 1961          Sheet 4 of 4

Inventor:
John Farmer
By Wilmer Mecklin
his Attorney

United States Patent Office 3,434,516
Patented Mar. 25, 1969

3,434,516
MACHINE FOR CORING PINEAPPLE SLICES
John Farmer, Honolulu, Hawaii, assignor to Honolulu Iron Works Company, Honolulu, Hawaii, a corporation of Hawaii
Original application Sept. 29, 1961, Ser. No. 141,680, now Patent No. 3,246,678, dated Apr. 19, 1966. Divided and this application Oct. 23, 1965, Ser. No. 503,857
Int. Cl. A47j 25/00; A23n 3/12
U.S. Cl. 146—6                8 Claims

ABSTRACT OF THE DISCLOSURE

A machine for coring pineapple slices having a tube for laterally supporting a slice, a trough in advance of the tube for centering a slice thereon, and a pusher and coring tube concentric with and normally beyond opposite ends of the supporting tube respectively for pushing a slice through the supporting tube and coring the slice during such pushing.

---

This invention relates to a machine for coring pineapple slices and this application is a division of my copending application Ser. No. 141,680, filed Sept. 29, 1961, now Patent No. 3,246,678, issued Apr. 19, 1966.

While attempted somewhat earlier, the mass production of canned pineapples actually began around 1914 with the introduction of the Ginaca machine or "Ginaca," as it is sometimes called. Although improvements have been made in the Ginaca from time to time, basically the same machine is in use in the pineapple canning industry today and invariably is used whenever pineapples are processed for producing the slices, chunks and tidbits of the solid pack. The lead machine in the conventional processing line, the Ginaca in one continuous operation sizes a pineapple by making a cylindrical cut to remove the shell and leave a fruit cylinder, cuts off the butt and crown at the ends of the cylinder, cuts out the core and finally discharges the cylinder for further processing. Conventionally, the further processing involves first inspection and hand trimming of the fruit cylinders to remove eyes, skin traces or other surface imperfections, followed by slicing of the cylinders into slices of predetermined thickness by a gang cutter which slices a pineapple in its entirety in a single sweep. Thereafter, the slices are inspected and sorted according quality and those suitable for the fancy, choice and standard grades of the solid pack are loaded into cans, usually by hand. The remaining, so-called salvage slices, in their turn, are consigned to the less profitable crushed and juice packs.

A Ginaca is effective in sizing, end-cutting and coring a pineapple, but is one of the most expensive individual machines used by the entire fruit canning industry and the conventional process entails more hand work than does the industrial canning of any other kind of fruit. For lack of anything better, the conventional processing line has heretofore been employed in recovering fruit for the solid pack from larger pineapples, but the expensiveness of the facilities, to say nothing of that of the necessary labor, have practically barred its use in recovering solid pack fruit from small pineapples weighing less than 2½ lbs. Consequently, even though small fruit usually has the tenderest meat, generally can product 1 T size slices and represents a substantial part of the yearly crop, it is now processed for the least profitable of the packs, the juice pack, with corresponding loss to the industry.

As opposed to the conventional process, it has now been found possible to process pineapples for the solid pack without using a Ginaca and so economically as to make it commercially practicable to recover meat for the solid pack from small as well as larger fruit. The new process is the invention described at length and claimed in the parent application, Ser. No. 141,680. The present invention is directed to a coring and resizing machine particularly suited for use in such a process.

An object of the invention is to provide a machine for coring pineapple slices.

An additional object of the invention is to provide a machine for coring pineapple slices as they are resized.

Another object of the invention is to provide a machine having interchangeable means for enabling it to core pineapple slices, either with or without concurrent resizing.

Other objects and advantages of the invention will appear hereinafter in the detailed description, be particularly pointed out in the appended claims and be illustrated in the accompanying drawings, in which:

FIGURE 2 is a vertical sectional view of the machine of FIGURE 1 taken along line 18—18 of FIGURE 3;

FIGURE 3 is a vertical sectional view taken along lines 19—19 of FIGURE 2;

FIGURE 4 is a frgamentary vertical sectional view taken along lines 20—20 of FIGURE 3;

FIGURE 5 is a vertical sectional view taken along lines 21—21 of FIGURE 3;

FIGURE 9 is a fragmentary vertical sectional view on an enlarged scale taken along lines 25—25 of FIGURE 3.

Figure 1:
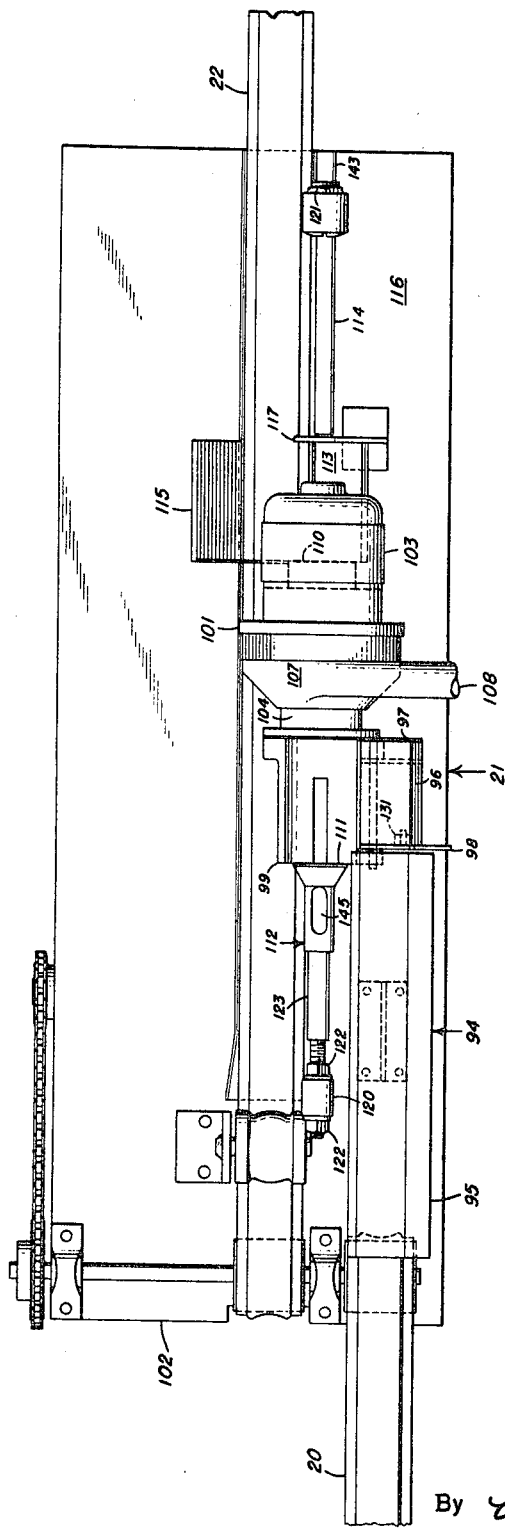
FIGURE 1 is a plan view on an enlarged scale of a preferred embodiment of the coring machine of the present invention.

Referring now in detail to the drawings in which like reference characters designate like parts, the improved machine of the present invention is adapted to core or both core and resize pineapple slices that are presented to it with their cores intact and is particularly designed for such use in the process of application Ser. No. 141,680.

Whether applied to small or larger pineapples, the essential steps in the process of application Ser. No. 141,680, in the sequence in which they are performed, are sizing, slicing and coring. The sizing operation of that invention is not the conventional sizing on a Ginaca machine followed in the machine's operating cycle by butt and crown or end cutting and by coring, but simply the making of a cylindrical cut to remove the shell and leave a fruit cylinder with its ends and core intact. The sizing operation may be and preferably is accompanied by eradication of the meat from the shell for use in the crushed and juice packs. However, even with this addition, the operation is readily performable on a machine that is much simpler and less expensive than a Ginaca machine and requires no complicated mechanism for feeding pineapples for sizing such as is necessitated by the Ginaca's cyclical operation. In turn, the slicing operation is not the conventional gang cutting of an end cut and cored fruit cylinder but the cutting of slices from a cylinder which at the time of cutting has its core and preferably also its butt and crown ends intact. The last of the essential steps, the coring, is performed on slices and, while in all cases the cores will be severed or cut from the surrounding ring of meat to form the familiar annular slices, the stage at which the fruit is cored enables the cores either to be removed or to be canned as a novelty item with the remaining meat.

As in the conventional process, it is contemplated in the process of application Ser. No. 141,680 to inspect the fruit undergoing treatment at different stages. At least three such inspections will usually be necessary, one, intermediate the sizing and slicing, to eliminate fruit that is wholly rotten or otherwise unusable, another, intermediate slicing and coring, to sort out the slices suitable for canning without further preparation other than coring, and the third, performed concurrently with or following the second, to sort from the remaining slices those having edible meat salvageable for the solid pack by resizing. In the handling incident to such inspections, as well as in the slicing, the intactness of the cores at these stages has the distinct advantage over the conventional process, in which the cores are removed at the outset, of preserving or retaining the relatively strong core structures for supporting the fruit, with consequent reduction in damage and breakage.

In the conventional process, the fruit not only is unsupported by its cores during the operation subsequent to the initial sizing, end cutting and coring by the Ginaca machine, but the eyes, skin traces and other peripheral or surface imperfections in the fruit cylinders are trimmed by hand from them before they are sliced. The expensiveness of the labor and the unavoidably high fruit loss involved in this trimming operation, are avoided, if, in accordance with the process of application Ser. No. 141,680, the hand trimming is dispensed with and, instead, the peripheral imperfections are removed after slicing from the slices containing them by resizing such slices to a smaller diameter to cut off an outer ring or annulus containing the imperfections and salvage the remaining meat for the solid pack. Although capable with modification of coring without resizing, it is to concurrent coring and resizing that the improved machine of this invention particularly lends itself.

In the preferred embodiment shown in the drawings, the coring and resizing machine, designated as 21, in large part is similar to the resizing machine illustrated in my copending application, Ser. No. 82,240, filed Jan. 12, 1961. Thus, as in that application, the slices selected for resizing, in this case with their cores intact, are transferred in sorting from a main belt (not shown) onto a feed belt 20 formed or contoured to receive and support the slices upright or on edge and are fed by that belt onto a correspondingly formed or contoured accumulator or supply trough 94 having a fixed lead or front section 95 and a swingable or oscillatable trailing or rear section 96. Also as in that application, the swingable rear section 96 is blocked or bounded at the rear by a fixed stop plate 97 for limiting forward progress of slices under force of the belt 20 on succeeding slices and has fixed to and depending from its front end a sweep 98 which stops or holds slices on the fixed front section 95 when the normal longitudinal alignment of the two sections is disturbed by swinging of the rear section.

The swinging mounting of the rear or transfer section 96 enables it at the inner limit of its swing to transfer a batch of slices to a centering trough 99 disposed parallel to but offset to one side of the accumulator trough. Corresponding in contour to the accumulator trough, the centering trough 99 is aligned longitudinally or coaxial with a resizing knife 100 mounted for rotation about a substantially horizontal axis in a housing 101 supported by a stand 102 and conveniently driven by an electric motor 103 surmounting the housing.

To hold each slice against turning during resizing, there preferably is interposed between the centering trough 99 and the resizing knife 100 a collar, sleeve or tube 104 which may be releasably mounted on the centering trough and has a cylindrical bore 105 of the size of the slices, the bore being interrupted by a plurality of circumferentially spaced blades or knives 106 instanding thereinto preferably to the depth of the peripheral portion of each slice to be removed in the resizing. These blades not only hold the slices against turning during resizing but radially cut their outer portions, thus causing those portions to divide into segments when they are cut in the resizing from the central portions of the slices. In case the portions removed in the resizing are to be consigned to the juice pack, as will be the case except in processing large fruit, it is preferred to mount about the lading portion of the resizing knife 100 a hood or shield 107 having a spout 108 directed toward or over a mid-part of a main belt (not shown) and to mount within the hood paddles or impellers 109 fixed for rotation with the knife for impelling the removed portions through the spout onto the main belt so that they can be carried by the latter to the end of the line and deposited on a juice cross conveyor, (not shown).

The illustrated embodiment has a second collar, sleeve or tube 110 mounted at the rear of the resizing knife 100 and having a smooth, cylindrical bore of the size of the resized slices and aligned axially or coaxial with the knife. Although this construction will suffice for a lower medium fruit line in which the resized slices usually will be inspected and sorted subsequent to the resizing for loading into cans as meat of any of a plurality of different grades, a different requirement is met in a small fruit line in which the resized slices are too small for loading as slices, if it is desired to can the resized slices as tidbits rather than as part of the crushed pack. In such case, the smooth-bored rear sleeve 110 wll usually be replaced by a fixed sleeve having a bore of the same inside diameter but, like the cutter head 79 shown in FIGURE 16 of application Ser. No. 141,680, carrying a plurality of circumferentially spaced fixed blades or cutters instanding radially into the bore to the depth of the resized slices after they have been cored. Correspondingly, the preferred frusto-conical head 111 of the pusher or plunger 112 by which the batch of slices is forced through the resizing knife will be radially slotted to enable the head to move past the blades and eject or discharge the slices in tidbit form onto a transversely directed slide or deflector 113 leading to the discharge conveyor 22, the latter being offset transversely from the axis of the knife and extending to the rear or discharge end of the line for transporting the tidbits to a can loader (not shown).

With the pusher 112 adapted to provide a positive force for pushing a slice entirely through the resizing knife 100 and associated front and rear collars 104 and 110, no gravity assist is necessary and the axis of the knife and the coaxial pusher can be horizontally disposed. To enable it to act on a batch of slices deposited on the centering trough 99 by the transfer section 96 of the supply trough 94, the head 111 of the pusher 112, in normal, retracted or at rest position, is disposed substantially at the front end of the centering trough.

Figure 6:
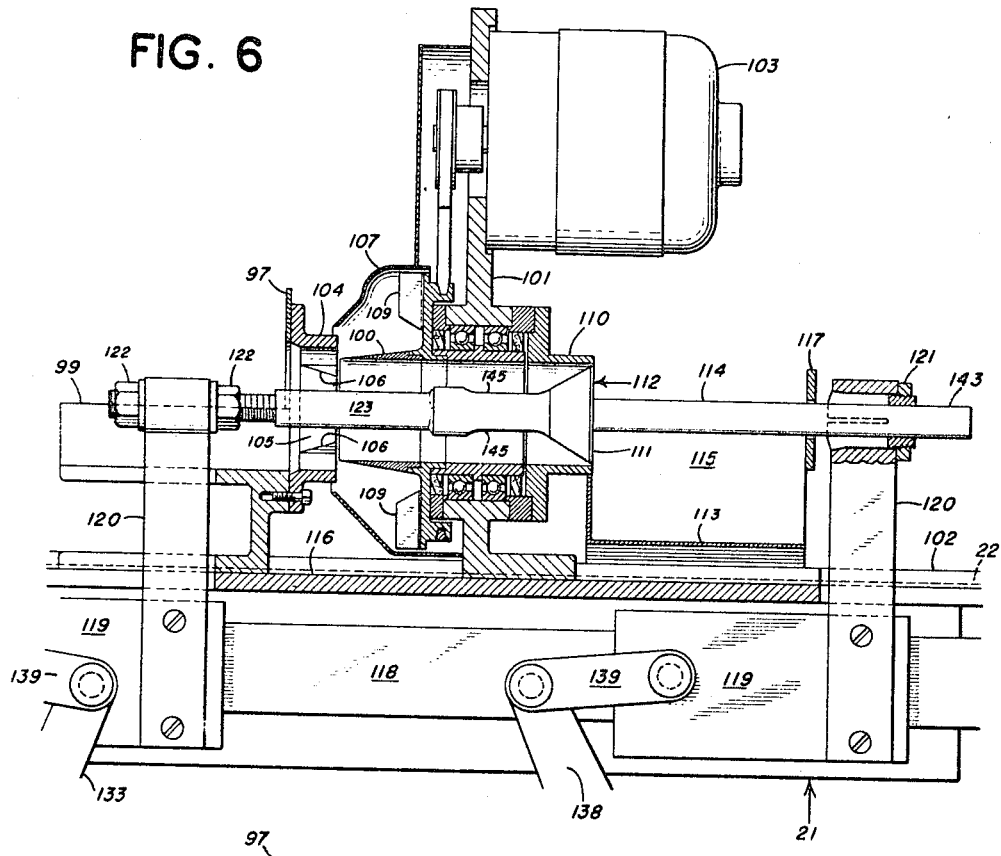
FIGURE 6 is a fragmentary vertical sectional view on an enlarged scale taken along lines 22—22 of FIGURE 2.

The resizing and coring machine 21 is designed to core the slices as they are resized and for this purpose is fitted with an open-ended coring tube 114 coaxial with the resizing knife 100 and adapted to act on the batch of slices from the rear in opposition to the action of the pusher 112. In order that it may core the slices while they are in and supported circumferentially by the resizing knife 100 and the rear collar 110, without interfering with deflection of discharged slices by the transfer slide 113 onto the discharge conveyor or belt 22, the coring tube 114 in its normal, retracted or at rest position is disposed rearwardly and clear of the slide 113, which in turn is positioned at the discharge end of the rear collar. As shown in FIGURES 3, 4 and 6, the slide 113 may be one side of a guide chute 115, the sides of which converge downwardly toward the discharge belt to direct the resized slices or tidbits thereonto and, for resized slices discharged as such rather than as tidbits, there is fixed to the platform 116 directly mounting the housing 101 at the rear of the guide chute 115 a wiper arm 117 apertured to receive the coring tube and wipe or remove cored slices therefrom as the tube retracts to normal position.

With the pusher 112 and coring tube 114 normally disposed in their retracted positions, it of course is necessary that each be slidable or reciprocable horizontally to and from their advanced positions, to enable them to act as intended on the slices. To this end, there is attached or fixed to the stand 102 of the machine below the platform 116 a slide bar or guide track 118 extending horizontally substantially the length of the stand and slidably mounting toward opposite ends a pair of longitudinally spaced carriages or slide blocks 119 to each of which is fixed or attached an arm or upright 120 extending upwardly through the platform and socketed thereabove to receive the pusher 112 or coring tube 114, as appropriate. Both the pusher and the coring tube preferably are made axially adjustable in their mountings by suitable means, such as the jam nut 121 in the case of the coring tube and, for the pusher, nuts 122 threaded to the shank 123 of the pusher at opposite sides of the associated arm 120.

In the cycle of operation of the resizing and coring machine 21, the transfer section 96 of the supply trough 94 first swings to deposit a batch of slices in the centering trough 99. The pusher 112 then pushes the slices through the resizing knife 100 and the coring tube 114 acts at the same time, concurrently or coincidentally, on the opposite end of the batch to core the slices. In the preferred machine, the oscillation of the transfer section and reciprocation of the carriages 119 on the slideway provided by the guide bar 118 and therethrough the corresponding movements of the pusher and coring tube, are all preferably made the responsibility of a single drive motor 124 mounted on the stand 102 below the platform 116 and drivably connected to the several operating elements for driving them in synchonism and this motor also is used to drive both the feed and discharge belts 20 and 22. In the case of the transfer section, the motor 124 is drivably connected through reduction gearing to a drive shaft 125 to which is fixed a cam 126 engaged by a roller 127 carried by one arm 128 of a bellcrank 129, and other arm 130 of which is connected by an adjustable linkage 131 to the transfer section 96, the linkage also conveniently being attached to one end of a tension spring 132 anchored at the other to the stand 102 for urging the roller into engagement with the cam. The pusher 112 and coring tube 114 in turn are reciprocated in opposite directions by a driving connection to the motor which includes a lever 133 pivoted at its lower end to the stand and having intermediate its ends a cam slot 134 in which rides a crank or eccentric roller 135, the crank arm of which conveniently is a disc 136 fixed to the drive shaft 125. This first lever 133 is connected, intermediate its pivot and the cam slot 134, by an adjustable link 137 to the lower end of a second lever 139 pivotally mounted intermediate its ends of the stand. The driving connection is completed by a pair of links 139, one connecting the upper end of the first or pusher lever 133 to the carriage 119 of the pusher 112 and the other correspondingly connecting the second or coring tube lever 138 to the carriage of the coring tube 114.

Although the coring tube 114 could be driven to first contact and then retreat before the confronting end of the pusher head 111, it is preferred for relative simplicity of drive and also to facilitate ejection of cores from the tube, that contiguous portions of the tube and pusher head overlap and interfit longitudinally or axially in the course of their reciprocal movements. For this purpose, the pusher head 111 is provided with an axial socket 140 opening rearwardly toward and adapted to accommodate or receive the confronting end portion of the coring tube and a push or thrust pin 141 within and concentric or coaxial and substantially coextensive axially with the socket, the push pin being adapted to be received or accommodated in the end portion of the coring tube as the latter is received in the socket. With this construction, the coring tube will cut through the slices and continue into the pusher head as each completes its advance stroke and in process the push pin 141 will push the cores rearwardly away from the cutting end 142 of the tube, unclogging the latter and, if the tube is then filled, ejecting a corresponding length of cores from the rear end 143 of the tube. In addition to its ability to unclog the bore 144 of the coring tube 114 adjacent the latter's cutting end 142 by action of its push pin 141, the head is rendered self-cleaning to prevent its socket from becoming clogged by juice or other matter clinging to the exterior of the received end portion of the tube, by the provision of radial cleaning slots 145 opening onto the socket and preferably extending from its inner toward its outer end.

Figure 8:
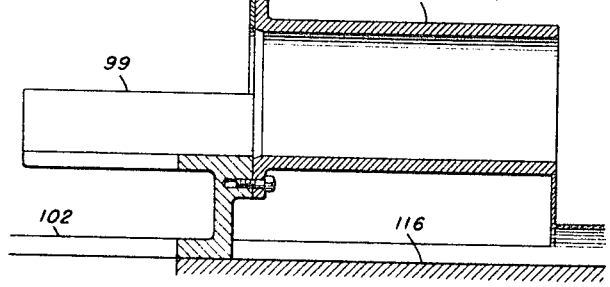
FIGURE 8 is a vertical sectional view on the section of FIGURE 6 of a sleeve interchangeable with the resizing means of FIGURE 6 for adapting the machine of the latter figure for coring without resizing.
Figure 7:
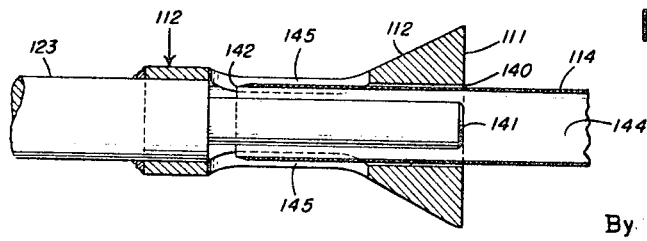
FIGURE 7 is a fragmentary longitudinal sectional view on an enlarged scale taken centrally through the plunger and coring tube of FIGURE 6.

The above described coring and resizing machine 21 is suitable for use in processing any of the several groups of pineapples from small to large, its adaptation to the resizing and coring of slices which subsequently are inspected and sorted for canning according to grade simply entailing the forming of the discharge belt 22 as indicated in FIGURE 9, so that it will support the cored and resized slices upright to facilitate subsequent handling. However, with a simple further modification, the same basic machine is also adapted to core initially unspotted slices from upper medium fruit which, because of variations in their quality, must be sorted and canned according to grade. The modification involved in the adaptation of the coring and resizing machine 21 to such use is the replacement of the tube assembly consisting of the resizing knife 100 and its attendant front and rear collars or tubes 104 and 110 by a smooth-bored open-ended tube or sleeve 146 of the same over-all length as the assembly but of the inside diameter of the front collar. Illustrated in FIGURE 8, the tube 146, interchangeable with the resizing knife and associated collars, is readily mountable on the rear end of the centering trough 99 in place of the front collar 104 of the illustrated machine and, when in place, enables the machine to core initial slices, the operation being exactly the same as that described for the illustrated machine except that the slices are not resized.

From the above detailed description, it will be apparent that there has been provided an improved machine which not only renders it unnecessary to core pineapples prior to inspection and sorting but also enables fruit for the solid pack to be recovered from peripherally imperfect slices. It should be understood that the described and disclosed embodiments are merely exemplary of the invention and that all modifications are intended to be included that do not depart from the spirit of the invention or the scope of the appended claims.

Having described my invention, I claim:

1. A machine for coring pineapple slices comprising tube means for laterally supporting a slice, and a pusher and a coring tube coaxial with and reciprocable axially relative to said tube means and normally disposed beyond opposite ends thereof, said pusher and coring tube acting oppositely, respectively, to push a slice through said tube means and to core said slice during said pushing.

2. A machine for coring slices comprising tube means for laterally supporting slices, a centering trough positioned in advance of said tube means, and a pusher and coring tube axially aligned with and normally disposed beyond opposite ends of said tube means, said coring tube and pusher acting concurrently on a batch of slices, respectively for pushing said batch from said centering trough through said tubular means and for coring said batch during pushing thereof by said pusher.

3. A machine for coring pineapple slices comprising tube means for laterally supporting slices, means for centering pineapple slices on said tube means, a pusher and a coring tube coaxial with and reciprocable axially relative to said tube means and normally disposed beyond opposite ends thereof, said pusher and coring tube acting oppositely, respectively, to push a slice through said tube means and to core said slice during said pushing, contiguous end portions of said pusher and coring tube slidably interfitting in the course of the coring, and means carried by said pusher end portion for cleaning said tube end portion during interfitting thereof.

4. A machine for coring pineapple slices comprising tube means, means for centering pineapple slices on said tube means, a pusher and a coring tube coaxial with and reciprocable axially relative to said tube means and normally disposed beyond opposite ends thereof, said pusher and coring tube acting oppositely, respectively, to push a slice through said tube means and to core said slice during said pushing, a socket in a head of said pusher slidably receiving a front end portion of said coring tube in the course of the coring, a thrust pin in said head within said socket and projecting into said end portion during reception thereof in said socket for pushing cores therefrom rearwardly in said coring tube, and slot means in said head and opening radially onto said socket for escape of matter carried into said socket by said coring tube.

5. A machine for coring and resizing pineapple slices comprising a rotary tubular resizing knife, a centering trough disposed forwardly of and aligned axially with said knife, means for feeding slices in batches to said trough, and a pusher and a coring tube coaxial with and normally disposed beyond opposite ends of said resizing knife, said tube and pusher acting concurrently on a batch of slices, respectively, for pushing said batch from said centering trough through said knife and for coring said batch during said pushing thereof by said pusher, and means disposed rearwardly of said knife and operative on a retract stroke of said tube for deflecting a cored batch out of the way of a sebsequent advance stroke of said tube.

6. A machine for coring and resizing pineapple slices comprising a rotary tubular resizing knife, a centering trough disposed forwardly of and aligned axially with said knife, means for feeding slices in batches to said trough, and a pusher and a coring tube disposed axially of said knife and reciprocable in opposite directions axially thereof, said pusher and coring tube normally being disposed beyond opposite ends of said knife and in their advance strokes projecting thereinto, respectively, for pushing a batch of slices from said centering trough through said knife and coring said batch during pushing thereof by said pusher.

7. A machine for coring and resizing pineapple slices comprising a rotary tubular resizing knife, a centering trough disposed forwardly of an aligned axially with said knife, means for feeding slices in batches to said trough, and a pusher and a coring tube coaxial with and normally disposed beyond opposite ends of said resizing knife, said tube and pusher acting concurrently on a batch of slices, respectively, for pushing said batch from said centering trough through said knife and for coring said batch during said pushing thereof by said pusher, means disposed rearwardly of said knife and operative on a retract stroke of said tube for deflecting a cored batch out of the way of a subsequent advance stroke of said tube, and a sleeve interchangeable with said resizing knife attachable to a rear end of said centering trough for enabling said pusher and coring tube to cooperate to core a batch without resizing the slices thereof.

8. A machine for coring and resizing pineapple slices comprising a rotary tubular resizing knife, a centering trough disposed forwardly of and aligned axially with said knife, means for feeding slices in batches to said trough, a pusher and a coring tube coaxial with and normally disposed beyond opposite ends of said resizing knife, said pusher and coring tube being slidably mounted on a common slideway and drivably connected for reciprocation in opposite directions therealong, and said pusher and coring tube acting concurrently on a batch of slices, respectively, for pushing said batch from said centering trough through said knife and for coring said batch during said pushing thereof by said pusher, and means disposed rearwardly of said knife and operative on a retract stroke of said coring tube for deflecting a cored batch to a side out of the way of a subsequent advance stroke of said tube.

References Cited
UNITED STATES PATENTS 3,057,386  10/1962  Massaro _____ 146—6 XR W. GRAYDON ABERCROMBIE, *Primary Examiner.*

U.S. Cl. X.R.

146—52